US006242830B1

United States Patent
Katagiri

(10) Patent No.: US 6,242,830 B1
(45) Date of Patent: Jun. 5, 2001

(54) MOTOR

(75) Inventor: Masayuki Katagiri, Nagano (JP)

(73) Assignee: Kabushiki Kaisha Sankyo Seiki Seisakusho, Nagaano (JP)

( * ) Notice: Subject to any disclaimer, the term of this patent is extended or adjusted under 35 U.S.C. 154(b) by 0 days.

(21) Appl. No.: 09/414,544

(22) Filed: Oct. 8, 1999

(30) Foreign Application Priority Data

Oct. 9, 1998 (JP) .................................................. 10-288292

(51) Int. Cl.⁷ ...................................................... H02K 5/16
(52) U.S. Cl. ................................ 310/90; 29/598; 384/114
(58) Field of Search .................................. 310/90, 89, 44; 384/113–115, 279, 428, 902; 29/598

(56) References Cited

U.S. PATENT DOCUMENTS

| 5,399,025 | * | 3/1995 | Higuchi et al. ....................... 384/428 |
| 5,466,070 | * | 11/1995 | Nakasugi ............................. 384/112 |
| 5,623,382 | * | 4/1997 | Moritan et al. .................... 360/99.08 |
| 5,628,569 | * | 5/1997 | Hayakawa et al. ................... 384/278 |
| 5,736,799 | * | 4/1998 | Harano et al. ......................... 310/90 |
| 5,762,423 | * | 6/1998 | Mori et al. ............................. 384/279 |
| 5,793,561 | * | 8/1998 | Ibaraki et al. .......................... 360/84 |
| 5,822,846 | * | 10/1998 | Moritan et al. ......................... 29/598 |
| 5,885,005 | * | 3/1999 | Nakano et al. ....................... 384/113 |
| 6,023,114 | * | 2/2000 | Mori et al. ............................. 310/90 |

FOREIGN PATENT DOCUMENTS 8-331820   12/1996  (JP) ............................. H02K/29/00

* cited by examiner

*Primary Examiner*—Nestor Ramirez
*Assistant Examiner*—Joseph Waks
(74) *Attorney, Agent, or Firm*—Sughrue, Mion, Zinn, Macpeak & Seas, PLLC

(57) ABSTRACT

In a motor having a bearing housing 7 with a hollow portion 23, a radial bearing 9 held in the hollow portion 23, a thrust receiving plate 8 provided at one end of the hollow portion 23, and a rotary shaft 1 which is rotatably supported by the radial bearing 9 in a state that an extreme end thereof is in contact with the thrust receiving plate 8, the bearing housing 7, shaped like a cup, includes a cylindrical portion 21 and a bottom portion 22 defining one end of the cylindrical portion 21, the cylindrical portion 21 and the bottom portion 22 define the hollow portion 23, the radial bearing 9 is firmly held with the inner surface of the cylindrical portion 21, and the thrust receiving plate 8 is supported on the bottom portion 22.

19 Claims, 5 Drawing Sheets

MOTOR

BACKGROUND OF INVENTION

1. Field of the Invention

The present invention relates to a motor well adaptable for a CD-ROM driver, a DVD-ROM drive or others.

2. Related art

A brushless motor, disclosed in JP-A-8-331820, has been known for a motor used for the CD-ROM drive, for example. The brushless motor follows. A rotary shaft is supported with aid of a radial bearing as a sintered oil-impregnated bearing and a thrust plate within a cylindrical bearing housing. The radial bearing is located in the upper portion of the bearing housing. The inside diameter of the lower part of the bearing housing is larger than that of the upper part thereof. A dish-like thrust cap is mounted on the lower part of the bearing housing. A thrust plate is disposed between the lower end of the rotary shaft and the thrust cap.

The motor is capable of preventing bearing lubricating oil from flowing out of a thrust receiving portion since the dish-like thrust cap is mounted on the lower part of the bearing housing, and a thrust plate is disposed between the lower end of the rotary shaft and the thrust cap. In the radial bearing fixed to the bearing housing, the lubricating oil receives a pumping action with rotation of the shaft, and flows downwardly of the inner wall of the bearing housing. The oil thus flowing out reaches a portion where the thrust cap is attached to the bearing housing. Even if the thrust cap is attached in press fitting manner, a minute gap will possibly be formed between the cap and the housing since those members are separate members. If such a gap is present, oil will leak through the gap outside the thrust cap.

When a disc is attached to the disc hub integral with the rotary shaft, a force is applied to the fixing portion for the thrust cap and the bearing housing in a direction in which the thrust cap is pulled out. As a result, the oil is likely to flow outside from the fixing portion.

SUMMARY OF INVENTION

Accordingly, an object of the present invention is to provide a motor which is free from the flowing of bearing lubricant oil outside the bearing housing, and has a long lifetime and a high reliability.

An aspect of the present invention, there is provided a motor comprising:

- a cup-like bearing housing integrally including a cylindrical portion, a bottom portion and a hollow portion defined by said cylindrical portion and said bottom;
- a radial bearing held in said hollow portion while being in contact with the inner surface of said cylindrical portion;
- a thrust receiving plate disposed at said bottom portion of said cup-like bearing housing; and
- a rotary shaft rotatably supported by said radial bearing in a state that an extreme end thereof is in contact with said thrust receiving plate.

In the present invention, the bearing housing, which is shaped like a cup, includes a cylindrical portion and a bottom portion closing one end of the cylindrical portion. Therefore, in the resultant motor, no bearing oil flows outside from the bottom portion of the bearing housing.

Shaping a metal sheet by drawing process forms the bearing housing. Therefore, the number of parts required is reduced. The unit form of the bearing housing eliminates the leakage of bearing oil out of the housing.

A gap, which may be utilized for an oil reservoir, is formed between the inner surface of the cylindrical portion of the bearing housing and the outer surface of the radial bearing. Provision of the gap prevents the bearing oil from leaking out of the bearing housing, elongates a lifetime of the motor, and allows bearing oil replenishment at the time of assembling the rotor into the structure.

DETAILED DESCRIPTION OF PREFERRED EMBODIMENTS

Figure 1:
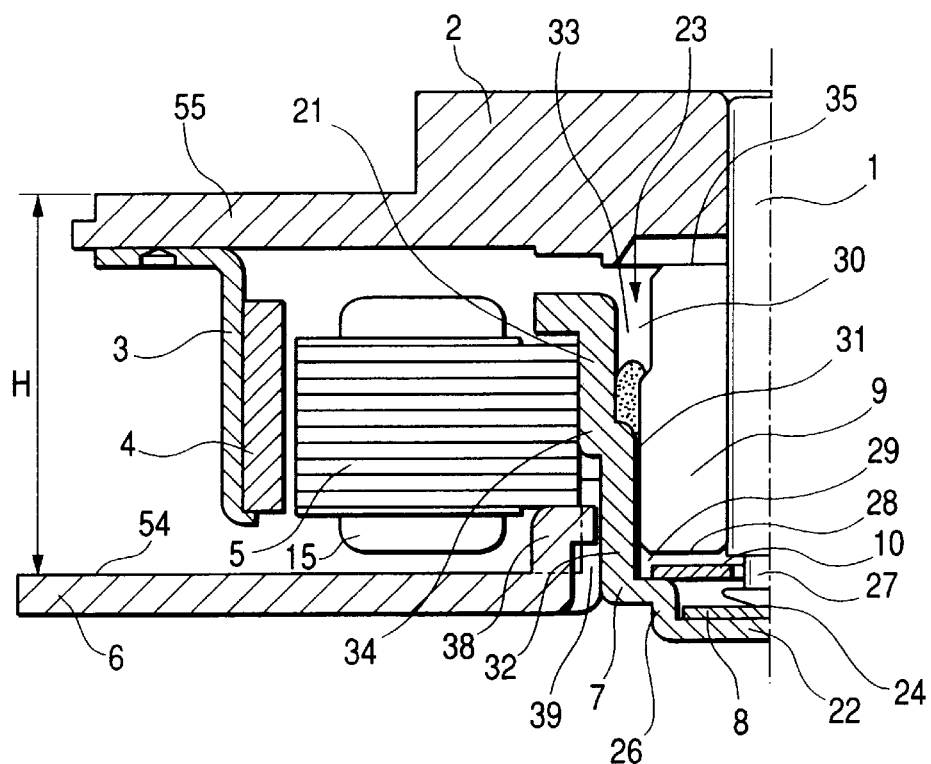
FIG. 1 is a cross sectional view showing a portion of a motor which constitutes a first embodiment of the present invention.

The preferred embodiments of the present invention will be described with reference to the accompanying drawings. As shown in FIG. 1, a bearing housing 7 includes a cylindrical portion 21, a bottom portion 22 and a hollow portion 23. To form the bearing housing 7, a metal sheet is pressed into a cup-like shape having the cylindrical portion 21 and the bottom portion 22 closing one end of the cylindrical portion 21. A thrust receiving plate 8 is placed on the bottom portion 22 within the hollow portion 23 of the bearing housing 7 while being centered. A radial bearing 9 is disposed within the cylindrical portion 21 of the bearing housing 7 while being in contact with the inner surface (peripheral) of the cylindrical portion 21. A rotary shaft 1 is supported by the inner surface of the radial bearing 9 in a state that it is rotatable about its center axis. In this case, the rotary shaft 1 rotates in a state that a extreme end 24 of the rotary shaft 1 is in contact with the thrust receiving plate 8. In the present embodiment, the drawing process is used for shaping a metal sheet into the cup-like bearing housing 7 with the bottom portion 22. However, any other suitable process may be used for the same purpose, as a matter of course.

A hub 2 to which a disc is set is secured onto the upper end of the rotary shaft 1. A rotor case 3 is fastened to the under surface of the hub 2. A rotor magnet 4, cylindrically shaped, is fastened onto the inner surface of the rotor case 3. A stator core 5 is fit to the outer surface (peripheral) of the cylindrical portion 21 of the bearing housing 7, while being disposed facing the inner surface of the rotor magnet 4. The stator core 5 includes a plural number of protruding poles, which are radially extended and equiangularly disposed around the core. Each protruding pole has a drive coil 15 wound thereon. The rotor case 3, the hub 2 and the rotary shaft 1 are rotatable in unison.

The bearing housing 7 has a stepped part 26, which is located between its bottom portion 22 and an end face 28 of one end of the radial bearing 9. The inside diameter of an upper portion of the cylindrical portion 21 above the stepped part 26 is larger than that of a lower portion of the cylindrical portion below the stepped part 26. The rotary shaft 1 includes a reduced-diameter portion 27, located between an extreme end 24 thereof closer to the thrust receiving plate 8 and an end face 28 of one end of the radial bearing 9. A washer 10 as ring-like slipping-off preventing means is placed between the stepped part 26 of the radial bearing 9 and the end face 28 of the radial bearing 9. The washer 10 engages the reduced-diameter portion 27 of the rotary shaft 1. Bringing the washer 10 into contact with the end face 28 of the radial bearing 9 reliably prevents the rotary shaft 1 from slipping off.

An upper portion of the bearing housing 7 above the stepped part 26 forms a bearing-fixing portion 32 the inside diameter of which is somewhat shorter than the outside diameter of the radial bearing 9. The radial bearing 9 is tightly inserted into the bearing-fixing portion 32 of the bearing housing 7. With this, The radial bearing 9 is fixedly supported with the bearing-fixing portion 32.

Another stepped part 34 is formed at a mid-position of the cylindrical portion 21 of the bearing housing 7. With provision of the stepped part 34, approximately the half of the axial length of the radial bearing 9 is held with the bearing fixing portion 32 of the bearing housing 7, which extends below the stepped part 34. A gap 33 is formed between the inner surface of the cylindrical portion 21 of the bearing housing 7 and the outer surface of the radial bearing 9. The gap 33 may be formed by selecting the inside diameter of the cylindrical portion 21 located above the stepped part 34 to be larger that outside diameter of the radial bearing 9. In an alternative formation of the gap 33, the outside diameter of the upper portion of the radial bearing 9 is selected to be larger than the inside diameter of the cylindrical portion 21 without forming the stepped part 34 on the cylindrical portion 21 of the bearing housing 7. A radial distance of the gap 33 is selected to be at least 25 μm, for example.

The gap 33 is utilized for an oil reservoir. When the rotary shaft 1 is rotated, oil is emitted from the radial bearing 9. The oil raises from the upper end face 35 of the radial bearing 9; flows to the outer periphery side of the radial bearing 9; stays in the rotor case 3; and returns to the radial bearing 9. It is noted here that the oil does not leak out of the bearing housing 7. This fact ensures a reliability and long lifetime of the resultant motor.

Figure 4:
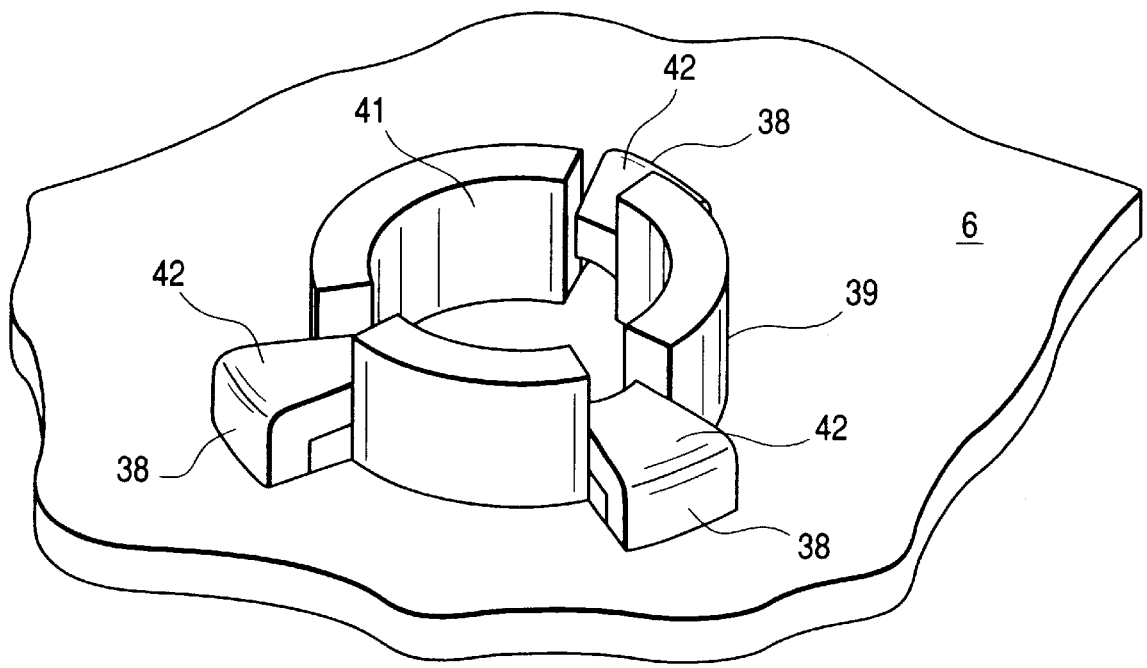
FIG. 4 is a perspective view showing a burring portion which may be used for the motor of the invention.

As shown in FIG. 4, a base plate 6 includes burring portions 39 formed by burring and core fixing portions 38 formed by bending a part of the base plate 6 in the vicinity of the burring portion 39. The core fixing portions 38 are angularly disposed at angular intervals each of 120° while being located each between the two adjacent the burring portions 39 being arranged in a ring-like fashion. Each core fixing portions 38 is shaped to include a vertical portion located outside the related burring portions 39 and a horizontal portion horizontally extending from the vertical portion toward a space between the related adjacent burring portions 39. The bearing housing 7 is press fit into the arrangement of the burring portions 39; the outer surface of the cylindrical portion 21 of the bearing housing 7 is firmly held with the inner surfaces of the burring portions 39. Accordingly, a verticality of the bearing housing 7 with respect to the base plate 6 is secured by the arrangement of the burring portions 39. To this end, a length of the inner surface 41 of each of the thus arranged burring portions 39 is selected so as to secure the verticality of the bearing housing 7 with respect to the base plate 6. An upper surface 55 (as a disc placing surface) of the hub 2 may be adjusted since an axial position of the bearing housing 7, viz., a press-fitting height, of the burring portions 39 may be adjusted with respect to the inner surfaces 41 of the burring portions 39. The verticality of the bearing housing 7 with respect to the arrangement of the burring portions 39 is adjusted as intended and then in this state those are coupled together by welding or bonding.

The embodiment provides a stator core fixing structure with a high rigidity for the following reason. The upper surfaces 42 of the fixing portions 38 are brought into contact with the lower surface of the stator core 5; the height of the stator core 5 is adjusted; and the cylindrical portion 21 of the bearing housing 7 holds the inner surface of the stator core 5 in a compressive manner.

Figure 5:
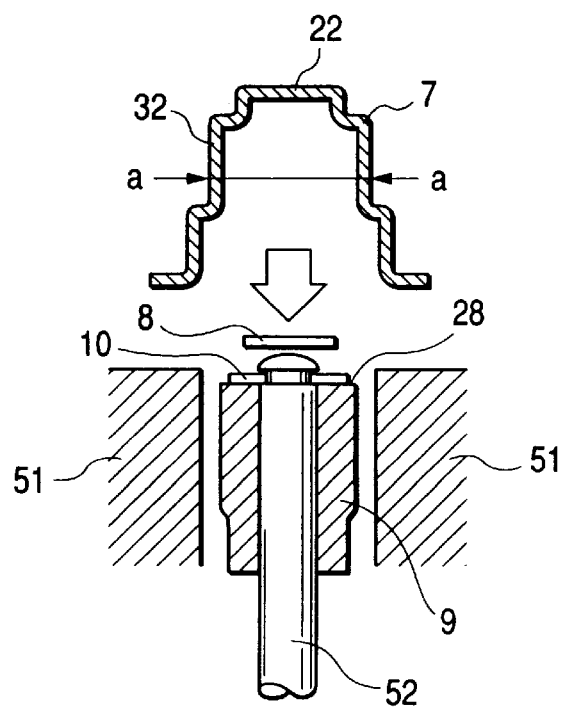
FIG. 5 is a cross sectional view showing a way of assembling a bearing assembly, which maybe used for the motor of the invention.

FIG. 5 is a cross sectional view useful in explaining a way of assembling a bearing assembly. As shown, a jig 51 is disposed to guide the rotary shaft 1 for its centering, and the radial bearing 9 is inserted into the jig 51. A guide bar 52 is inserted into the radial bearing 9. The thrust receiving plate 8 is put on the top of the guide bar 52; the washer 10 is placed between the thrust receiving plate 8 and the end face 28 of one end of the radial bearing 9; and in this state, the bearing housing 7 shaped like a cup is press fit to the thus assembled structure. In this case, the bearing housing 7 is moved till its bottom portion 22 comes into contact with the thrust receiving plate 8. In this state, the outer surface of the radial bearing 9 is firmly fixed with the bearing-fixing portion 32 of the bearing housing 7. In actually assembling the rotor, the guide bar 52 is pulled out of the radial bearing 9 and the rotary shaft 1 is inserted into the same instead.

Figure 3A:
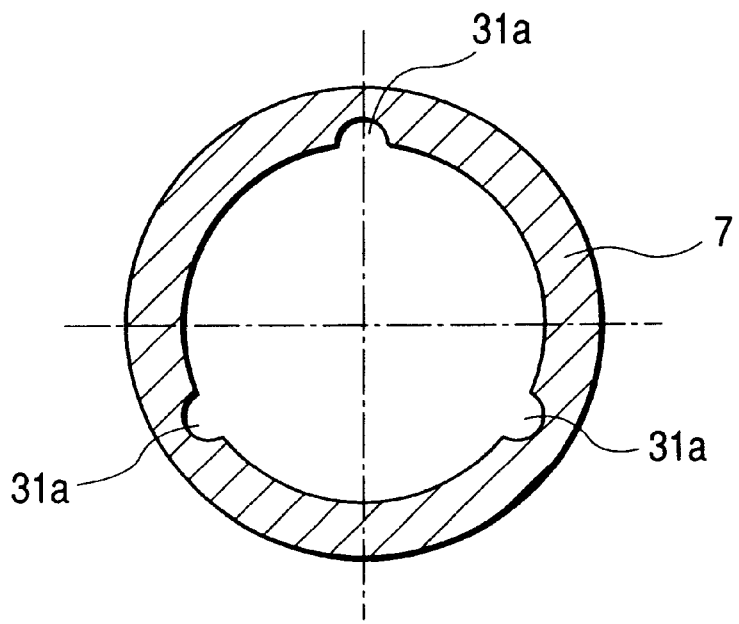
FIG. 3(a) and FIG. 3(b) are cross sectional views showing a bearing housing which may be used for the motor of the invention.
Figure 3B:
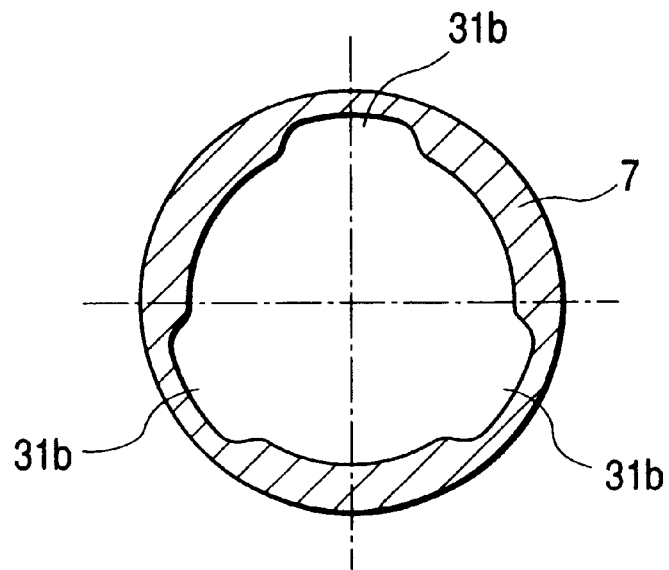

FIG. 3 is a cross sectional view of the bearing housing 7, taken line a—a in FIG. 5. Axially elongated grooves 31 are formed in the inner surface of the bearing housing 7. The grooves 31 communicates a space 29, which is formed by the end face 28 of one end of the radial bearing 9 and the bottom portion 22 of the bearing housing 7, with a space 30 located closer to the opening end of the bearing housing 7. FIG. 30A shows a cross sectional view of the bearing housing 7 in which three axially elongated grooves 31a semicircular in cross section are formed in the inner surface of the bearing fixing portion 32 while being equiangularly arranged. FIG. 3B shows a cross sectional view of the bearing housing 7 in which three axially elongated grooves 31b shaped like U in cross section are formed in the inner surface of the bearing fixing portion 32 while being equiangularly arranged.

Figure 6:
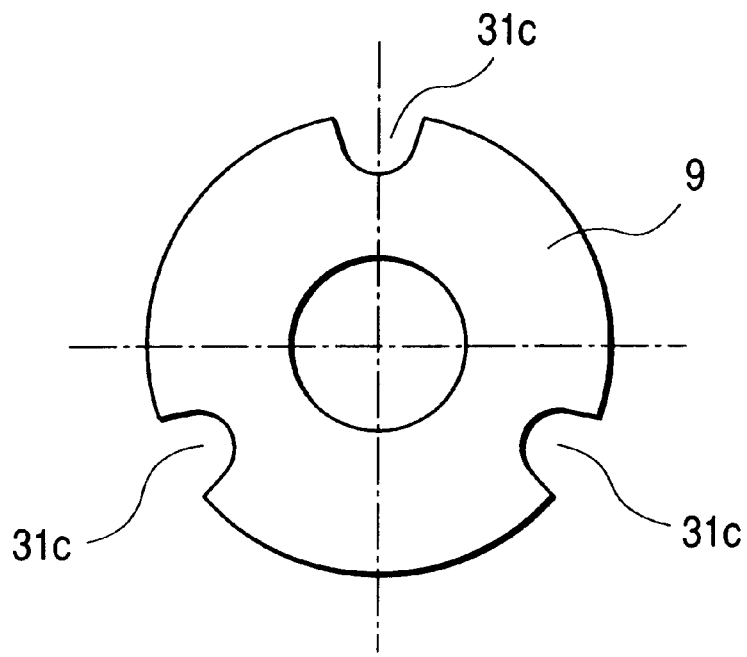
FIG. 6 is a cross sectional view showing a thrust bearing assembly which may used for the motor of the invention.

Another bearing housing 7 is shown in FIG. 6. The bearing housing 7 includes three axially elongated grooves 31c, which are formed in the outer surface of the radial bearing 9 while being arranged equiangularly. As recalled, in each of the above two bearing housings 7, the grooves axial grooves 31a (31b) are formed in the inner surface of the bearing housing 7. The size and the number of grooves may properly be selected in accordance with a kind of motor used.

Thus, at least one groove 31 is formed in the inner surface of the bearing housing 7 or the outer surface of the radial bearing 9. The groove 31 yields the following advantages. When the rotary shaft 1 is inserted into the radial bearing 9, air present in the space 29 in the vicinity of the bottom portion 22 of the bearing housing 7 is guided outside. Further, provision of the groove 31 prevents oil from overflowing through the edge of the radial bearing 9 when the rotary shaft 1 is inserted into the radial bearing 9.

A fixing strength of the outer surface of the radial bearing 9 may be adjusted to a necessary one in a manner that a balance between the outer surface of the radial bearing 9 with the bearing fixing portion 32 of the bearing housing 7 when those are in contact with each other is varied by varying the combination of the number and the size of the of the grooves 31 as oil-leak preventing means and the axial length of the bearing fixing portion 32 of the bearing housing 7.

Further, with provision of the grooves 31 formed in the bearing-fixing portion 32 of the bearing housing 7 or in the outer surface of the radial bearing 9, part of oil moves to the washer 10 and the extreme end of the radial bearing 9. The oil present there functions to stabilize a frictional resistance between the thrust receiving plate 8 and the rotary shaft 1 for a long time.

Figure 7A:
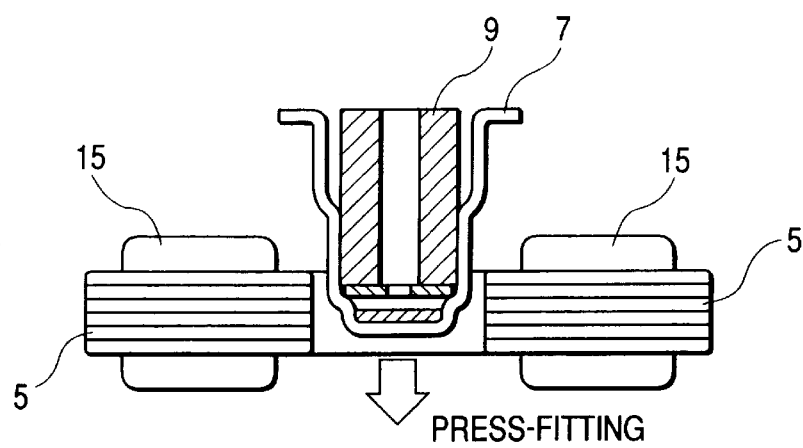
FIG. 7(a)–FIG. 7(c) are side views showing a way of assembling a stator assembly which may be used for the motor of the invention.
Figure 7B:
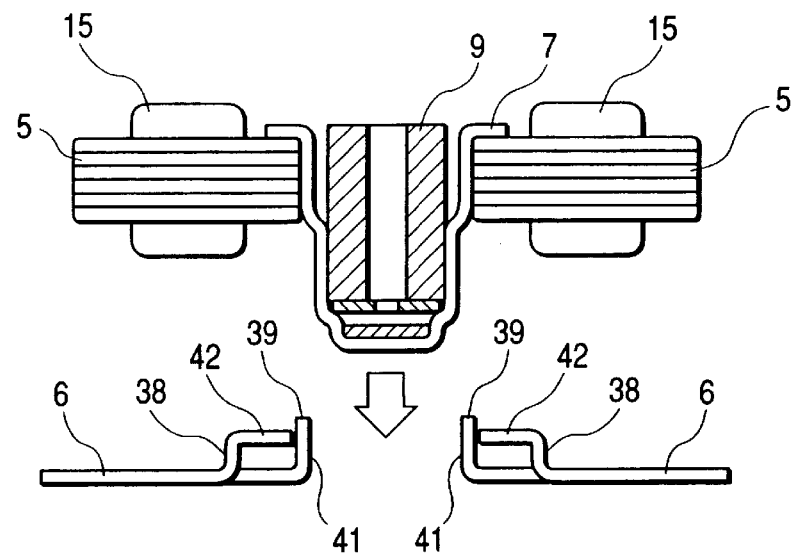
Figure 7C:
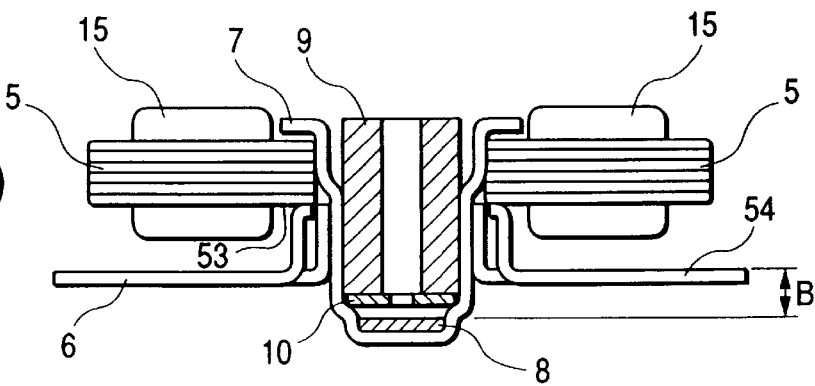

FIG. 7 is a side view showing a way of assembling a stator assembly, which may be used for the motor of the invention. A bearing assembly formed by inserting the radial bearing 9 into the bearing housing 7, as shown in FIG. 7A, is forcibly inserted into the center hole of the stator core 5 in a state that the opening end of the assembly is directed upward. As a result, a close contact is established between the outer surface of the bearing housing 7 and the inner surface of the center hole of the stator core 5, and the former is fixed by the latter. As already stated, the base plate 6 includes the burring portions 39 formed by burring and the core fixing portions 38 formed by bending a part of the base plate 6 at a location near the burring portion 39. After forcibly inserted and fixed by the stator core 5, the bearing assembly is press fit into the hole defined by the burring portions 39 (FIG. 7B). Then, the outer (peripheral) surface of the cylindrical portion 21 of the bearing housing 7 is firmly held by the inner surfaces 41 of the burring portions 39, and the lower surface 53 of the stator core 5 is put on the upper surfaces 42 of the core fixing portions 38, and positioned thereat (FIG. 7C). Incidentally, bearing oil may be put, for its replenishment, into the gap 33 located between the radial bearing 9 and the bearing housing 7 after the stator assembly is assembled.

Figure 8:
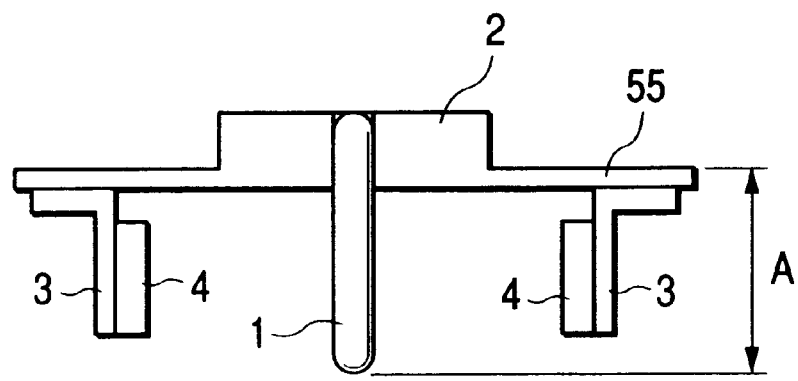
FIG. 8 is a side view showing a way of assembling a rotor assembly which may be used for the motor of the invention.

A height H from the upper surface 54 (as a reference surface) of the base plate 6 to the disc placing surface 55 of the hub 2 is given by $$H = A - B \qquad (1)$$

where A is a distance from the extreme end 24 of the rotary shaft 1 which is located closer to the thrust receiving plate 8 to the disc placing surface 55, and B is a distance from the reference surface 54 to the upper surface of the thrust receiving plate 8 (FIGS. 1, 5, 7C and 8). The length of the rotary shaft 1, as shown in FIG. 8 determines the distance A. The distance B varies with a position of the bearing housing 7 when it is press fit into the burring portions 39 of the base plate 6 (FIG. 7C). (This position of the bearing housing 7 will be referred to a "fitting position".) From this, it is seen that the height H ranging from the reference surface 54 to the disc placing surface 55 may be adjusted by the "fitting position" of the bearing housing 7. It is noted here that the burring portions 39 holds the bearing housing 7 so as to allow the bearing housing 7 to be movable in the axial and circumferential directions. Therefore, adjusting the fitting position in an actual assembling work can precisely set the height H.

As well known, to operate the thus constructed motor, electric current is fed to the drive coils in accordance with angular positions of the rotor magnet 4. Electromagnetic forces are developed between the stator core 5 and the rotor magnet 4. The rotor magnet 4, and the rotor case 3 and the hub 2, which are coupled together with the rotor magnet 4, are driven to rotate in unison.

Figure 2:
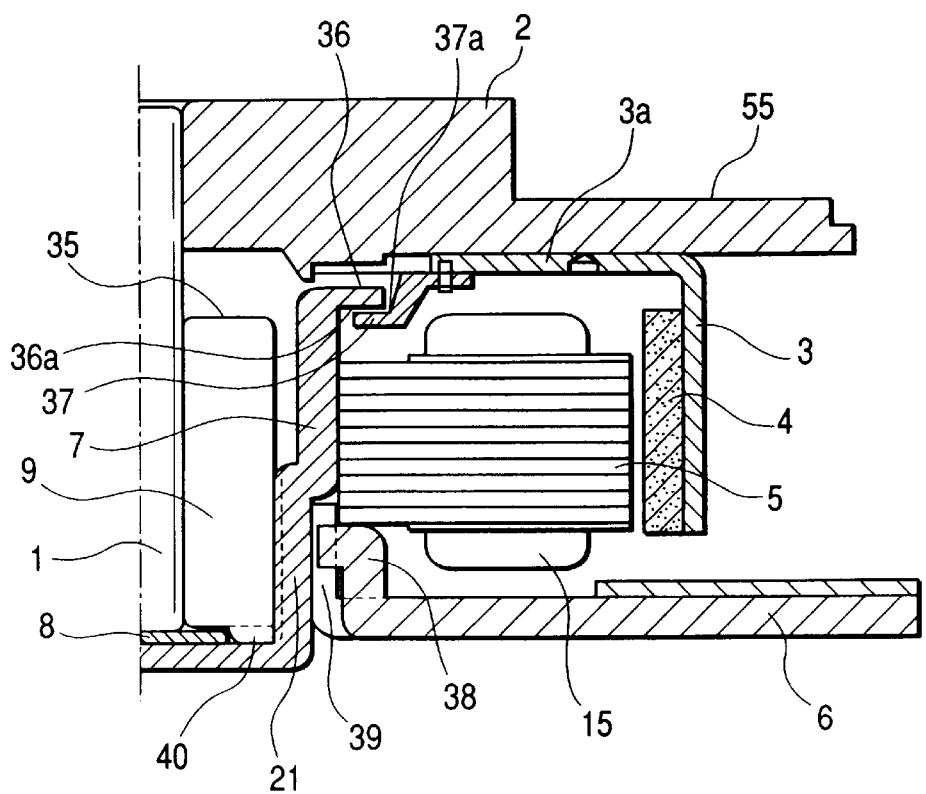
FIG. 2 is a cross sectional view showing a portion of another motor which constitutes a second embodiment of the present invention.

The FIG. 1 motor described above includes the washer 10 as means for preventing the rotary shaft 1 from slipping off. Another rotor slipping-off means may be used as shown in FIG. 2. In a structure of the motor shown in FIG. 2, the rotor slipping-off preventing means 10 (FIG. 1) is not used; the bearing housing 7 does not include the stepped part 26; and the rotary shaft 1 does not include the reduced-diameter portion 27. Also in the FIG. 2 structure, a centering guide portion 40, while being protruded, is formed on the end face of the lower end of the radial bearing 9. The centering guide portion 40 is used for centering the thrust receiving plate 8.

As shown, a flange-like portion 36 is formed on the end of the bearing housing 7 at which the housing is opened. Rotor slipping-off preventing means 37 is extended from a horizontal part 3a of the rotor case 3, which is mounted on the under side of the hub 2, toward the flange-like portion 36. In a normal state of the motor, the upper surface 37a of the rotor slipping-off preventing means 37 is separated from the lower surface 36a of the flange-like portion 36. When impact is imparted on the motor, the lower surface 36a of the flange-like portion 36 is brought into contact with the upper surface 37a of the rotor slipping-off preventing means 37, thereby preventing the rotor from slipping off.

The motor of FIG. 2 has the following advantages because of its technical feature not using the rotor slipping-off preventing means. If the radial bearing of the FIG. 2 motor has the axial length equal to that of the radial bearing of the FIG. 1 motor, the radial bearing 9 which is placed within the bearing housing 7 may be low in height. This leads to the thinned motor structure. Further, the upper end face 35 of the radial bearing 9 may be located below the flange-like portion 36 of the bearing housing 7. This feature provides a structure making it difficult for oil to flow out of the bearing housing 7.

In the present invention, the drawing process is used for shaping a metal sheet into the cup-like bearing housing with the bottom portion in order to firmly hold the radial bearing 9 and the stator core 5 with the bearing housing. Use of the cup shape of the bearing housing 7 eliminates the leakage of oil that is contained in the radial bearing 9 from its bottom portion. The resultant motor is high in reliability and long in lifetime. The gap 33 provided between the radial bearing 9 and the bearing housing 7 functions to prevent oil from leaking, and further may be used as a space for the replenishing of bearing oil at the time of assembling the rotor into the structure.

While the present invention has been described using specific embodiments, it should be understood that the invention may variously be modified, changed and altered within the true spirits of the invention.

In the present invention, the bearing housing, which is shaped like a cup, includes a cylindrical portion and a bottom portion closing one end of the cylindrical portion. Therefore, in the resultant motor, no bearing oil flows outside from the bottom portion of the bearing housing.

Shaping a metal sheet by drawing process forms the bearing housing. Therefore, the number of parts required is reduced. The unit form of the bearing housing eliminates the leakage of bearing oil out of the housing.

A gap, which may be utilized for an oil reservoir, is formed between the inner surface of the cylindrical portion of the bearing housing and the outer surface of the radial bearing. Provision of the gap prevents the bearing oil from leaking out of the bearing housing, elongates a lifetime of the motor, and allows bearing oil replenishment at the time of assembling the rotor into the structure.

What is claimed is:

1. A motor comprising:
   a cup-like bearing housing processed from a one piece metal material including a cylindrical portion having a bearing fixing portion with an inner circumferential surface and an outer circumferential surface and a core holding portion with an inner circumferential surface and an outer circumferential surface, a bottom portion, and a hollow portion defined by said cylindrical portion and said bottom portion;
   a radial bearing having an inner circumferential surface and an outer circumferential surface held in said bearing fixing portion while the outer circumferential surface of said radial bearing is in contact with the inner circumferential surface of said bearing fixing portion;
   a gap serving as an oil reservoir between the inner circumferential surface of the core holding portion and the outer circumferential surface of said radial bearing, said gap being disposed on an opposite side of the bearing fixing portion from said bottom portion;
   a stator core having an inner surface and an outer surface, the inner surface of said stator core contacting the outer circumferential surface of the core holding portion;
   a thrust receiving plate disposed at said bottom portion of said cup-like bearing housing; and
   a rotary shaft rotatably supported by said radial bearing in a state that an extreme end thereof is in contact with said thrust receiving plate.

2. A motor in accordance with claim 1, wherein said bearing housing is formed by shaping a metal sheet by a drawing process.

3. A motor in accordance with claim 1, wherein said cylindrical portion further comprises:
   a step portion between the bearing fixing portion and the core holding portion, the core holding portion having a greater diameter than the bearing fixing portion, said radial bearing made of a sintered oil-impregnated alloy.

4. A motor in accordance with claim 1, wherein said bearing housing has a stepped part, located between a bottom portion of said bearing fixing portion and an end face of one end of said radial bearing, said rotary shaft includes a reduced-diameter portion, which is located on an end of said rotary shaft closer to said thrust receiving plate, and a ring-like slipping-off preventing means placed between said stepped part of said bearing housing and the end face of said radial bearing, while engaging said reduced-diameter portion of said rotary shaft.

5. A motor in accordance with claim 1, wherein a flange-like portion, while bent outward, is formed on an end of said bearing housing at which said bearing housing is opened, and rotor slipping-off preventing means is extended from a rotor of said motor toward said flange-like portion.

6. A motor in accordance with claim 1, wherein axially elongated grooves are formed in the outer circumferential surface of said radial bearing or the inner circumferential surface of said bearing housing, said grooves communicating a space, which is formed by an end face of one end of said radial bearing and said bottom portion of said cup-like bearing housing, with another space located closer to an open end of said cup-like bearing housing.

7. A motor in accordance with claim 1, wherein said motor includes a stator plate, said stator plate includes burring portions being arranged in a ring-like fashion, and said burring portions hold the outer circumferential surface of said bearing housing.

8. A motor in accordance with claim 7, wherein said burring portions of said stator plate hold said bearing housing such that said bearing housing is movable in axial or circumferential directions.

9. A motor in accordance with claim 8, wherein said bearing housing is fixedly coupled to said stator plate in a state that said bearing housing is set at a predetermined position of said burring portions and held by said burring portions.

10. A motor in accordance with claim 7, where core fixing portions are formed by bending a part of said stator plate in the vicinity of said burring portion, and a stator core is brought into contact with said core fixing portions.

11. A motor comprising:
    a rotor portion with a rotary shaft;
    a stator portion disposed facing said rotor portion;
    a cup-like bearing housing provided from a one piece metal material and integrally including a cylindrical portion and a bottom portion, the cylindrical portion having a bearing fixing portion;
    a radial bearing, held by said bearing fixing portion, rotatably supporting said rotary shaft in a radial directions while being held within said bearing housing, a gap serving as an oil reservoir and being defined by the cylindrical portion and an outer circumferential surface of the radial bearing at a portion opposite to the bottom portion relative to the bearing fixing portion, where a outer circumferential surface of a core holding portion of said bearing housing holds an inner circumference of a core of said stator portion; and
    a thrust bearing, disposed on said bottom portion, for supporting said rotary shaft in a thrust direction.

12. A motor in accordance with claim 11, wherein said radial bearing is a sintered oil-impregnated bearing, and said bearing housing includes a bearing fixing portion for holding said radial bearing having been press fit thereinto, a positioning portion for positioning said radial bearing within said bearing housing, and oil storing portion for storing oil to be impregnated into aid sintered oil-impregnated bearing.

13. A motor in accordance with claim 12, wherein a disc hub for the attaching and detaching of a disc is attached to said rotary shaft, and the directions of attaching and detaching the disc are coincident with the contacting direction of said thrust bearing.

14. A motor comprising:
    a cup-like bearing housing integrally including a cylindrical portion, a bottom portion and a hollow portion defined by said cylindrical portion and said bottom;
    a radial bearing held in said hollow portion while being in contact with an inner surface of said cylindrical portion;
    a thrust receiving plate disposed at said bottom portion of said cup-like bearing housing; and
    a rotary shaft rotatably supported by said radial bearing in a state that an extreme end thereof is in contact with said thrust receiving plate; wherein said bearing housing has a stepped part, which is located between said bottom portion thereof and an end face of one end of said radial bearing, said rotary shaft includes a reduced-diameter portion, which is located on an end of said rotary shaft closer to said thrust receiving plate and ring-like slipping-off preventing means is placed between said stepped part of said radial bearing and the end face of said radial bearing, while engaging said reduced-diameter portion of said rotary shaft.

15. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing; and a rotary shaft rotatably supported by said radial bearing in a state that an extreme end thereof is in contact with said thrust receiving plate; wherein a flange-like portion, while bent outward, is formed on an end of said bearing housing at which said bearing housing is opened, and rotor slipping-off preventing means is extended from a rotor of said motor toward said flange-like portion.

16. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said motor includes a stator plate, said stator plate includes burring portions being arranged in a ring-like fashion, and said burring portions hold an outer surface of said bearing housing.

17. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said burring portions of said stator plate hold said bearing housing such that said bearing housing is movable in axial or circumferential directions.

18. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said bearing housing is fixedly coupled to said stator plate in a state that said bearing housing is set at a predetermined position of said burring portions and held by said burring portions.

19. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; where core fixing portions are formed by bending a part of said stator plate in the vicinity of said burring portion, and a stator core is brought into contact with said core fixing portions.

* * * * *

(12) EX PARTE REEXAMINATION CERTIFICATE (7894th)
United States Patent
Katagiri

(10) Number: US 6,242,830 C1
(45) Certificate Issued: Nov. 30, 2010

(54) MOTOR

(75) Inventor: Masayuki Katagiri, Nagano (JP)

(73) Assignee: Nidec Corporation, Kuze Minami-Ku, Kyoto (JP)

Reexamination Request:
No. 90/009,293, Oct. 3, 2008
No. 90/009,401, Feb. 6, 2009

Reexamination Certificate for:
Patent No.: 6,242,830
Issued: Jun. 5, 2001
Appl. No.: 09/414,544
Filed: Oct. 8, 1999

(30) Foreign Application Priority Data

Oct. 9, 1998 (JP) ............................................. 10-288292

(51) Int. Cl.
H02K 1/18 (2006.01)
H02K 5/16 (2006.01)

(52) U.S. Cl. .............................. 310/90; 29/598; 284/114
(58) Field of Classification Search .................... None
See application file for complete search history.

(56) References Cited

U.S. PATENT DOCUMENTS

| | | | |
|---|---|---|---|
| 4,017,964 A | * | 4/1977 | Schulte et al. ................. 29/596 |
| 4,800,309 A | | 1/1989 | Lakin |
| 5,094,550 A | * | 3/1992 | Momose et al. ............. 384/420 |
| 5,145,266 A | | 9/1992 | Saneshige et al. |
| 5,256,922 A | | 10/1993 | Tanaka et al. |
| 5,399,025 A | | 3/1995 | Higuchi et al. |
| 5,463,511 A | | 10/1995 | Nakano et al. |
| 5,466,070 A | | 11/1995 | Nakasugi |
| 5,528,092 A | | 6/1996 | Ohta |
| 5,578,883 A | | 11/1996 | Sakashita et al. |
| 5,623,382 A | | 4/1997 | Moritan et al. |
| 5,628,569 A | | 5/1997 | Hayakawa et al. |
| 5,677,585 A | | 10/1997 | Ida et al. |
| 5,736,799 A | | 4/1998 | Harano et al. |
| 5,762,423 A | | 6/1998 | Mori et al. |
| 5,793,561 A | | 8/1998 | Ibaraki et al. |
| 5,822,846 A | | 10/1998 | Moritan et al. |
| 5,885,005 A | | 3/1999 | Nakano et al. |
| 6,023,114 A | | 2/2000 | Mori et al. |
| 6,125,098 A | | 9/2000 | Osawa |
| 6,205,110 B1 | | 3/2001 | Miyamoto et al. |
| 6,256,289 B1 | | 7/2001 | Miyamoto |
| 6,339,273 B1 | | 1/2002 | Higuchi |

FOREIGN PATENT DOCUMENTS

| | | |
|---|---|---|
| DE | 3223057 A1 | 1/1983 |
| GB | 2159078 A | 11/1985 |
| JP | 62-021751 U | 2/1987 |
| JP | 03-040872 U | 4/1991 |
| JP | 03-078448 | 4/1991 |
| JP | 04-281351 A | 10/1992 |
| JP | 05-168192 A | 7/1993 |
| JP | 06-103690 A | 4/1994 |
| JP | 06-121483 A | 4/1994 |
| JP | 06-178481 A | 6/1994 |
| JP | 06-205567 A | 7/1994 |
| JP | 06-223493 | 8/1994 |
| JP | 06-284637 A | 10/1994 |
| JP | 07-059324 | 3/1995 |

(Continued)

OTHER PUBLICATIONS

Japanese Article "The Tribology," No. 114 (Tribology).

*Primary Examiner*—Lynne H Browne

(57) ABSTRACT

In a motor having a bearing housing 7 with a hollow portion 23, a radial bearing 9 held in the hollow portion 23, a thrust receiving plate 8 provided at one end of the hollow portion 23, and a rotary shaft 1 which is rotatably supported by the radial bearing 9 in a state that an extreme end thereof is in contact with the thrust receiving plate 8, the bearing housing 7, shaped like a cup, includes a cylindrical portion 21 and a bottom portion 22 defining one end of the cylindrical portion 21, the cylindrical portion 21 and the bottom portion 22 define the hollow portion 23, the radial bearing 9 is firmly held with the inner surface of the cylindrical portion 21, and the thrust receiving plate 8 is supported on the bottom portion 22.

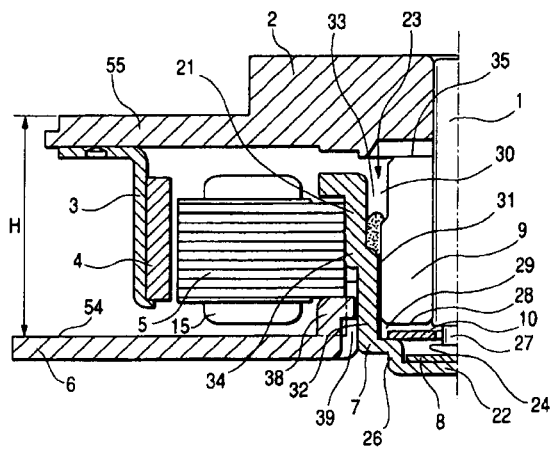

FOREIGN PATENT DOCUMENTS

| | | |
|---|---|---|
| JP | 07-063224 A | 3/1995 |
| JP | 07-236247 A | 9/1995 |
| JP | 07-284240 A | 10/1995 |
| JP | 07-296501 A | 11/1995 |
| JP | 08-033261 | 2/1996 |
| JP | 08-186970 A | 7/1996 |
| JP | 08-228453 A | 9/1996 |
| JP | 08-275437 A | 10/1996 |
| JP | 08-331820 A | 12/1996 |
| JP | 09-177776 A | 7/1997 |
| JP | 10-023702 A | 1/1998 |
| JP | 10-051991 A | 2/1998 |
| JP | 10-108405 A | 4/1998 |
| JP | 10-127006 | 5/1998 |
| JP | 10-201164 A | 7/1998 |

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 14 is confirmed.

Claims 1, 2, 5-7, 10-13 and 16-18 are cancelled.

Claim 3, 4 and 8 are determined to be patentable as amended.

Claims 9, dependent on an amended claim, is determined to be patentable.

New claims 20-85 are added and determined to be patentable.

Claims 15 and 19 were not reexamined.

3. A motor [in accordance with claim 1] *comprising:*
*a cup-like bearing housing processed from a one piece metal material including a cylindrical portion having a bearing fixing portion with an inner circumferential surface and an outer circumferential surface and a core holding portion with an inner circumferential surface and an outer circumferential surface, a bottom portion, and a hollow portion defined by said cylindrical portion and said bottom portion;*
*a radial bearing having an inner circumferential surface and an outer circumferential surface held in said bearing fixing portion while the outer circumferential surface of said radial bearing is in contact with the inner circumferential surface of said bearing fixing portion;*
*a gap serving as an oil reservoir between the inner circumferential surface of the core holding portion and the outer circumferential surface of said radial bearing, said gap being disposed on an opposite side of the bearing fixing portion from said bottom portion;*
*a stator core having an inner surface and an outer surface, the inner surface of said stator core contacting the outer circumferential surface of the core holding portion;*
*a thrust receiving plate disposed at said bottom portion of said cup-like bearing housing; and*
*a rotary shaft rotatably supported by said radial bearing in a state that an extreme end thereof is in contact with said thrust receiving plate,*
wherein said cylindrical portion further comprises:
a step portion between the bearing fixing portion and the core holding portion, the core holding portion having a greater diameter than the bearing fixing portion, said radial bearing made of a sintered oil-impregnated alloy.

4. A motor [in accordance with claim 1] *comprising:*
*a cup-like bearing housing processed from a one piece metal material including a cylindrical portion having a bearing fixing portion with an inner circumferential surface and an outer circumferential surface and a core holding portion with an inner circumferential surface and an outer circumferential surface, a bottom portion, and a hollow portion defined by said cylindrical portion and said bottom portion;*
*a radial bearing having an inner circumferential surface and an outer circumferential surface held in a said bearing fixing portion while the outer circumferential surface of said radial bearing is in contact with the inner circumferential surface of said bearing fixing portion;*
*a gap serving as an oil reservoir between the inner circumferential surface of the core holding portion and the outer circumferential surface of said radial bearing, said gap being disposed on an opposite side of the bearing fixing portion from said bottom portion;*
*a stator core having an inner surface and an outer surface, the inner surface of said stator core contacting the outer circumferential surface of the core holding portion;*
*a thrust receiving plate disposed at said bottom portion of said cup-like bearing housing; and*
*a rotary shaft rotatably supported by said radial bearing in a state that an extreme end thereof is in contact with said thrust receiving plate,*
wherein said bearing housing has a stepped part, located between a bottom portion of said bearing fixing portion and an end face of one end of said radial bearing, said rotary shaft includes a reduced-diameter portion, which is located on an end of said rotary shaft closer to said thrust receiving plate, and a ring-like slipping-off preventing means placed between said stepped part of said bearing housing and the end face of said radial bearing, while engaging said reduced-diameter portion of said rotary shaft.

8. A motor [in accordance with claim 7] *comprising:*
*a cup-like bearing housing processed from a one piece metal material including a cylindrical portion having a bearing fixing portion with an inner circumferential surface and an outer circumferential surface and a core holding portion with an inner circumferential surface and an outer circumferential surface, a bottom portion, and a hollow portion defined by said cylindrical portion and said bottom portion;*
*a radial bearing having an inner circumferential surface and an outer circumferential surface held in said bearing fixing portion while the outer circumferential surface of said radial bearing is in contact with the inner circumferential surface of said bearing fixing portion;*
*a gap serving as an oil reservoir between the inner circumferential surface of the core holding portion and the outer circumferential surface of said radial bearing, said gap being disposed on an opposite side of the bearing fixing portion from said bottom portion;*
*a stator core having an inner surface and an outer surface, the inner surface of said stator core contacting the outer circumferential surface of the core holding portion;*
*a thrust receiving plate disposed at said bottom portion of said cup-like bearing housing; and*
*a rotary shaft rotatably supported by said radial bearing in a state that an extreme end thereof is in contact with said thrust receiving plate,*
wherein said motor includes a stator plate, said stator plate includes burring portions being arranged in a ring-like fashion, and said burring portions hold the outer circumferential surface of said bearing housing, wherein said burring portions of said stator plate hold said bearing housing such that said bearing housing is movable in axial or circumferential directions.

20. A motor comprising:

a cup-like bearing housing processed from a one piece metal material including a cylindrical portion having a bearing fixing portion with an inner circumferential surface and an outer circumferential surface and a core holding portion with an inner circumferential surface and an outer circumferential surface, a bottom portion, and a hollow portion defined by said cylindrical portion and said bottom portion;

a radial bearing having an inner circumferential surface and an outer circumferential surface held in said bearing fixing portion while the outer circumferential surface of said radial bearing is in contact with the inner circumferential surface of said bearing fixing portion;

a gap serving as an oil reservoir between the inner circumferential surface of the core holding portion and the outer circumferential surface of said radial bearing, said gap being disposed on an opposite side of the bearing fixing portion from said bottom portion;

a stator core having an inner surface and an outer surface, the inner surface of said stator core contacting the outer circumferential surface of the core holding portion;

a thrust receiving plate disposed at said bottom portion of said cup-like bearing housing; and a rotary shaft rotatably supported by said radial bearing in a state that an extreme end thereof is in contact with said thrust receiving plate, wherein said cylindrical portion includes an inner circumferential portion and a step portion at the inner circumferential portion, wherein at least a part of the cylindrical portion below the step portion serves as the bearing fixing portion, wherein a portion of the radial bearing above the step portion rotatably supports the rotary shaft.

21. The motor in accordance with claim 20, wherein the inner circumferential portion above the step portion has a greater diameter than that of the bearing fixing portion.

22. The motor in accordance with claim 20, wherein the radial bearing is a single piece member.

23. The motor in accordance with claim 20, wherein a portion of the radial bearing below the step portion rotatably supports the rotary shaft.

24. The motor in accordance with claim 20, wherein said cylindrical portion further comprises an opening opposite to the bottom portion, the radial bearing being inserted from the opening within the bearing housing.

25. A motor comprising:

a cup-like bearing housing processed from a one piece metal material including a cylindrical portion having a bearing fixing portion with an inner circumferential surface and an outer circumferential surface and a core holding portion with an inner circumferential surface and an outer circumferential surface, a bottom portion, and a hollow portion defined by said cylindrical portion and said bottom portion;

a radial bearing having an inner circumferential surface and an outer circumferential surface held in said bearing fixing portion while the outer circumferential surface of said radial bearing is in contact with the inner circumferential surface of said bearing fixing portion;

a gap serving as an oil reservoir between the inner circumferential surface of the core holding portion and the outer circumferential surface of said radial bearing, said gap being disposed on an opposite side of the bearing fixing portion from said bottom portion;

a stator core having an inner surface and an outer surface, the inner surface of said stator core contacting the outer circumferential surface of the core holding portion;

a thrust receiving plate disposed at said bottom portion of said cup-like bearing housing; and a rotary shaft rotatably supported by said radial bearing in a state that an extreme end thereof is in contact with said thrust receiving plate, wherein the cylindrical portion includes a first inner circumferential portion and a second inner circumferential portion, the first inner circumferential portion has an inner diameter larger than that of the second inner circumferential portion, wherein a part of the second inner circumferential portion is press fit to the radial bearing at the bearing fixing portion, wherein a portion of the radial bearing above the bearing fixing portion rotatably supports the rotary shaft inside the first inner circumferential portion.

26. The motor in accordance with claim 25, wherein the cylindrical portion further includes a step portion between the first inner circumferential portion and the second inner circumferential portion.

27. The motor in accordance with claim 25, wherein the radial bearing is a single piece member.

28. The motor in accordance with claim 25, wherein said cylindrical portion further comprises an opening opposite to the bottom portion, the radial bearing being inserted from the opening within the bearing housing.

29. A motor comprising:

a cup-like bearing housing processed from a one piece metal material including a cylindrical portion having a bearing fixing portion with an inner circumferential surface and an outer circumferential surface and a core holding portion with an inner circumferential surface and an outer circumferential surface, a bottom portion, and a hollow portion defined by said cylindrical portion and said bottom portion;

a radial bearing having an inner circumferential surface and an outer circumferential surface held in said bearing fixing portion while the outer circumferential surface of said radial bearing is in contact with the inner circumferential surface of said bearing fixing portion;

a gap serving as an oil reservoir between the inner circumferential surface of the core holding portion and the outer circumferential surface of said radial bearing, said gap being disposed on an opposite side of the bearing fixing portion from said bottom portion;

a stator core having an inner surface and an outer surface, the inner surface of said stator core contacting the outer circumferential surface of the core holding portion;

a thrust receiving plate disposed at said bottom portion of said cup-like bearing housing; and a rotary shaft rotatably supported by said radial bearing in a state that an extreme end thereof is in contact with said thrust receiving plate, wherein said cylindrical portion further comprises: an inner circumferential portion and a step portion at the inner circumferential portion between the bearing fixing portion and the core holding portion, the inner circumferential surface of the core holding portion having a greater diameter than the inner circumferential surface of the bearing fixing portion.

30. A motor comprising:

a cup-like bearing housing processed from a one piece metal material including a cylindrical portion having a bearing fixing portion with an inner circumferential surface and an outer circumferential surface and a core holding portion with an inner circumferential surface and an outer circumferential surface, a bottom portion, and a hollow portion defined by said cylindrical portion and said bottom portion;

a radial bearing having an inner circumferential surface and an outer circumferential surface held in said bearing fixing portion while the outer circumferential surface of said radial bearing is in contact with the inner circumferential surface of said bearing fixing portion;

a gap serving as an oil reservoir between the inner circumferential surface of the core holding portion and the outer circumferential surface of said radial bearing, said gap being disposed on an opposite side of the bearing fixing portion from said bottom portion;

a stator core having an inner surface and an outer surface, the inner surface of said stator core contacting the outer circumferential surface of the core holding portion;

a thrust receiving plate disposed at said bottom portion of said cup-like bearing housing; and a rotary shaft rotatably supported by said radial bearing in a state that an extreme end thereof is in contact with said thrust receiving plate, wherein the core holding portion has an inner diameter greater than that of the bearing fixing portion.

31. A motor comprising:

a rotor portion with a rotary shaft;

a stator portion disposed facing said rotor portion;

a cup-like bearing housing provided from a one piece metal material and integrally including a cylindrical portion and a bottom portion, the cylindrical portion having a bearing fixing portion;

a radial bearing, held by said bearing fixing portion, rotatably supporting said rotary shaft in a radial directions while being held within said bearing housing, a gap serving as an oil reservoir and being defined by the cylindrical portion and an outer circumferential surface of the radial bearing at a portion opposite to the bottom portion relative to the bearing fixing portion, where a outer circumferential surface of a core holding portion of said bearing housing holds an inner circumference of a core of said stator portion; and a thrust bearing, disposed on said bottom portion, for supporting said rotary shaft in a thrust direction, wherein said cylindrical portion includes an inner circumferential portion and a step portion at the inner circumferential portion, wherein at least a part of the cylindrical portion below the step portion serves as the bearing fixing portion, wherein a portion of the radial bearing above the step portion rotatably supports the rotary shaft.

32. The motor in accordance with claim 31, wherein the inner circumferential portion above the step portion has a greater diameter than that of the bearing fixing portion.

33. The motor in accordance with claim 31, wherein the radial bearing is a single piece member.

34. The motor in accordance with claim 31, wherein a portion of the radial bearing below the step portion rotatably supports the rotary shaft.

35. The motor in accordance with claim 31, wherein said cylindrical portion further comprises an opening opposite to the bottom portion, the radial bearing being inserted from the opening within the bearing housing.

36. A motor comprising:

a rotor portion with a rotary shaft;

a stator portion disposed facing said rotor portion;

a cup-like bearing housing provided from a one piece metal material and integrally including a cylindrical portion and a bottom portion, the cylindrical portion having a bearing fixing portion;

a radial bearing, held by said bearing fixing portion, rotatably supporting said rotary shaft in a radial directions while being held within said bearing housing, a gap serving as an oil reservoir and being defined by the cylindrical portion and an outer circumferential surface of the radial bearing at a portion opposite to the bottom portion relative to the bearing fixing portion, where a outer circumferential surface of a core holding portion of said bearing housing holds an inner circumference of a core of said stator portion; and a thrust bearing, disposed on said bottom portion, for supporting said rotary shaft in a thrust direction, wherein the cylindrical portion includes a first inner circumferential portion and a second inner circumferential portion, the first inner circumferential portion has an inner diameter larger than the second inner circumferential portion, wherein a part of the second inner circumferential portion is press fit to the radial bearing at the bearing fixing portion, wherein a portion of the radial bearing above the bearing fixing portion rotatably supports the rotary shaft inside the first inner circumferential portion.

37. The motor in accordance with claim 36, wherein the cylindrical portion further includes a step portion between the first inner circumferential portion and the second inner circumferential portion.

38. The motor in accordance with claim 36, wherein the radial bearing is a single piece member.

39. The motor in accordance with claim 36, wherein said cylindrical portion further comprises an opening opposite to the bottom portion, the radial bearing being inserted from the opening within the bearing housing.

40. A motor comprising:

a rotor portion with a rotary shaft;

a stator portion disposed facing said rotor portion;

a cup-like bearing housing provided from a one piece metal material and integrally including a cylindrical portion and a bottom portion, the cylindrical portion having a bearing fixing portion;

a radial bearing, held by said bearing fixing portion, rotatably supporting said rotary shaft in a radial directions while being held within said bearing housing, a gap serving as an oil reservoir and being defined by the cylindrical portion and an outer circumferential surface of the radial bearing at a portion opposite to the bottom portion relative to the bearing fixing portion, where a outer circumferential surface of a core holding portion of said bearing housing holds an inner circumference of a core of said stator portion; and a thrust bearing, disposed on said bottom portion, for supporting said rotary shaft in a thrust direction, wherein said cylindrical portion further comprises: an inner circumferential portion and a step portion at the inner circumferential portion between the bearing fixing portion and the core holding portion, the inner circumferential surface of the core holding portion having a greater diameter than the inner circumferential surface of the bearing fixing portion.

41. A motor comprising:

a rotor portion with a rotary shaft;

a stator portion disposed facing said rotor portion;

a cup-like bearing housing provided from a one piece metal material and integrally including a cylindrical portion and a bottom portion, the cylindrical portion having a bearing fixing portion;

a radial bearing, held by said bearing fixing portion, rotatably supporting said rotary shaft in a radial directions while being held within said bearing housing, a gap serving as an oil reservoir and being defined by the cylindrical portion and an outer circumferential surface of the radial bearing at a portion opposite to the bottom portion relative to the bearing fixing portion, where a outer circumferential surface of a core holding portion of said bearing housing holds an inner circumference of a core of said stator portion; and a thrust bearing, disposed on said bottom portion, for supporting said rotary shaft in a thrust direction, wherein the core holding portion has an inner diameter greater than that of the bearing fixing portion.

42. The motor in accordance with claim 14, wherein said cylindrical portion includes an inner circumferential portion and a step portion at the inner circumferential portion, wherein at least a part of the cylindrical portion below the step portion serves as a bearing fixing portion, wherein a portion of the radial bearing above the step portion rotatably supports the rotary shaft.

43. The motor in accordance with claim 42, wherein the inner circumferential portion above the step portion has a greater diameter than that of the bearing fixing portion.

44. The motor in accordance with claim 14, wherein the radial bearing is a single piece member.

45. The motor in accordance with claim 42, wherein a portion of the radial bearing below the step portion rotatably supports the rotary shaft.

46. The motor in accordance with claim 14, wherein said cylindrical portion further comprises an opening opposite to the bottom portion, the radial bearing being inserted from the opening within the bearing housing.

47. The motor in accordance with claim 14, wherein the cylindrical portion includes a first inner circumferential portion and a second inner circumferential portion, the first inner circumferential portion has an inner diameter larger than the second inner circumferential portion, wherein a part of the second inner circumferential portion is press fit to the radial bearing at a bearing fixing portion, wherein a portion of the radial bearing above the bearing fixing portion rotatably supports the rotary shaft inside the first inner circumferential portion.

48. The motor in accordance with claim 47, wherein the cylindrical portion further includes a step portion between the first inner circumferential portion and the second inner circumferential portion.

49. The motor in accordance with claim 47, wherein the radial bearing is a single piece member.

50. The motor in accordance with claim 47, wherein said cylindrical portion further comprises an opening opposite to the bottom portion, the radial bearing being inserted from the opening within the bearing housing.

51. The motor in accordance with claim 14, wherein said cylindrical portion further comprises: an inner circumferential portion and a step portion at the inner circumferential portion between a bearing fixing portion and a core holding portion, an inner circumferential surface of the core holding portion having a greater diameter than an inner circumferential surface of the bearing fixing portion.

52. The motor in accordance with claim 14, wherein said motor includes a stator plate, said stator plate includes a burring portion contacting an outer circumferential surface of said bearing housing.

53. The motor in accordance with claim 14, wherein said bearing housing is fixedly coupled to a stator plate in a state that said bearing housing is set at a predetermined position of a burring portion and held by said burring portion.

54. The motor in accordance with claim 14, wherein a core holding portion has an inner diameter greater than that of a bearing fixing portion.

55. The motor in accordance with claim 25, wherein a portion of the radial bearing below the bearing fixing portion rotatably supports the rotary shaft inside the second inner circumferential portion.

56. The motor in accordance with claim 36, wherein a portion of the radial bearing below the bearing fixing portion rotatably supports the rotary shaft inside the second inner circumferential portion.

57. A motor comprising:

a cup-like bearing housing processed from a one piece metal material including a cylindrical portion having a bearing fixing portion with an inner circumferential surface and an outer circumferential surface and a core holding portion with an inner circumferential surface and an outer circumferential surface, a bottom portion, and a hollow portion defined by said cylindrical portion and said bottom portion;

a radial bearing having an inner circumferential surface and an outer circumferential surface held in said bearing fixing portion while the outer circumferential surface of said radial bearing is in contact with the inner circumferential surface of said bearing fixing portion;

a gap serving as an oil reservoir between the inner circumferential surface of the core holding portion and the outer circumferential surface of said radial bearing, said gap being disposed on an opposite side of the bearing fixing portion from said bottom portion;

a stator core having an inner surface and an outer surface, the inner surface of said stator core contacting the outer circumferential surface of the core holding portion;

a thrust receiving plate disposed at said bottom portion of said cup-like bearing housing;

a rotary shaft rotatably supported by said radial bearing in a state that an extreme end thereof is in contact with said thrust receiving plate; and a step portion located on an inner circumferential surface of the bearing housing and located between the core holding portion and the bearing fixing portion.

58. The motor in accordance with claim 57, wherein the gap is located axially above the step portion.

59. The motor in accordance with claim 57, wherein the radial bearing extends axially above the step portion.

60. A motor comprising:

a rotor portion with a rotary shaft;

a stator portion disposed facing said rotor portion;

a cup-like bearing housing provided from a one piece metal material and integrally including a cylindrical portion and a bottom portion, the cylindrical portion having a bearing fixing portion;

a radial bearing, held by said bearing fixing portion, rotatably supporting said rotary shaft in a radial directions while being held within said bearing housing, a gap serving as an oil reservoir and being defined by the cylindrical portion and an outer circumferential surface of the radial bearing at a portion opposite to the bottom portion relative to the bearing fixing portion, where a outer circumferential surface of a core holding portion of said bearing housing holds an inner circumference of a core of said stator portion;

a thrust bearing, disposed on said bottom portion, for supporting said rotary shaft in a thrust direction; and a step portion located on an inner circumferential surface of the bearing housing and located between the core holding portion and the bearing fixing portion.

61. The motor in accordance with claim 60, wherein the gap is located axially above the step portion.

62. The motor in accordance with claim 60, wherein the radial bearing extends axially above the step portion.

63. The motor in accordance with claim 14, further comprising:

a step portion located on an inner circumferential surface of the bearing housing and located between a core holding portion and a bearing fixing portion.

64. The motor in accordance with claim 63, wherein a gap is located axially above the step portion.

65. The motor in accordance with claim 63, wherein the radial bearing extends axially above the step portion.

66. The motor in accordance with claim 14, further comprising:

a step portion located on an inner circumferential surface of the bearing housing.

67. The motor in accordance with claim 47, wherein a portion of the radial bearing below the bearing fixing portion rotatably supports the rotary shaft inside the second inner circumferential portion.

68. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said motor includes a stator plate, said stator plate includes burring portions being arranged in a ring-like fashion, and said burring portions hold an outer surface of said bearing housing, wherein said cylindrical portion includes an inner circumferential portion and a step portion at the inner circumferential portion, wherein the cup-like bearing housing is processed from a one piece metal material by a drawing process, wherein at least a part of the cylindrical portion below the step portion serves as a bearing fixing portion, wherein a portion of the radial bearing above the step portion rotatably supports the rotary shaft.

69. The motor in accordance with claim 68, wherein the inner circumferential portion above the step portion has a greater diameter than that of the bearing fixing portion.

70. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said motor includes a stator plate, said stator plate includes burring portions being arranged in a ring-like fashion, and said burring portions hold an outer surface of said bearing housing, wherein the radial bearing is a single piece member, wherein the cylindrical portion includes a first inner circumferential portion and a second inner circumferential portion, the first inner circumferential portion has an inner diameter larger than the second inner circumferential portion, wherein the cup-like bearing housing is processed from a one piece metal material by a drawing process, wherein a part of the second inner circumferential portion is press fit to the radial bearing at a bearing fixing portion, wherein a portion of the radial bearing above the bearing fixing portion rotatably supports the rotary shaft inside the first inner circumferential portion.

71. The motor in accordance with claim 70, wherein a portion of the radial bearing below the bearing fixing portion rotatably supports the rotary shaft inside the second inner circumferential portion.

72. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said motor includes a stator plate, said stator plate includes burring portions being arranged in a ring-like fashion, and said burring portions hold an outer surface of said bearing housing, wherein said cylindrical portion further comprises: an inner circumferential portion and a step portion at the inner circumferential portion between a bearing fixing portion and a core holding portion, an inner circumferential surface of the core holding portion having a greater diameter than an inner circumferential surface of the bearing fixing portion, wherein the cup-like bearing housing is processed from a one piece metal material by a drawing process.

73. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing; a rotary shaft rotatably supported by said radial bearing in a state that an extreme end thereof is in contact with said thrust receiving plate; wherein said motor includes a stator plate, said stator plate includes burring portions being arranged in a ring-like fashion, and said burring portions hold an outer surface of said bearing housing, wherein a core holding portion has an inner diameter greater than that of a bearing fixing portion.

74. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said burring portions of said stator plate hold said bearing housing such that said bearing housing is movable in axial or circumferential directions, wherein said cylindrical portion includes an inner circumferential portion and a step portion at the inner circumferential portion, wherein the cup-like bearing housing is processed from a one piece metal material by a drawing process, wherein at least a part of the cylindrical portion below the step portion serves as a bearing fixing portion, wherein a portion of the radial bearing above the step portion rotatably supports the rotary shaft.

75. The motor in accordance with claim 74, wherein the inner circumferential portion above the step portion has a greater diameter than that of the bearing fixing portion.

76. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said burring portions of said stator plate hold said bearing housing such that said bearing housing is movable in axial or circumferential directions;

wherein the radial bearing is a single piece member, wherein the cylindrical portion includes a first inner circumferential portion and a second inner circumferential portion, the first inner circumferential portion has an inner diameter larger than the second inner circumferential portion, wherein the cup-like bearing housing is processed from a one piece metal material by a drawing process, wherein a part of the second inner circumferential portion is press fit to the radial bearing at a bearing fixing portion, wherein a portion of the radial bearing above the bearing fixing portion rotatably supports the rotary shaft inside the first inner circumferential portion.

77. The motor in accrodance with claim 76, wherein a portion of the radial bearing below the bearing fixing portion rotatably supports the rotary shaft inside the second inner circumferential portion.

78. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said burring portions of said stator plate hold said bearing housing such that said bearing housing is movable in axial or circumferential directions, wherein said cylindrical portion further comprises: an inner circumferential portion and a step portion at the inner circumferential portion between a bearing fixing portion and a core holding portion, an inner circumferential surface of the core holding portion having a greater diameter than an inner circumferential surface of the bearing fixing portion, wherein the cup-like bearing housing is processed from a one piece metal material by a drawing process.

79. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said burring portions of said stator plate hold said bearing housing such that said bearing housing is movable in axial or circumferential directions, wherein a core holding portion has an inner diameter greater than that of a bearing fixing portion.

80. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said bearing housing is fixedly coupled to said stator plate in a state that said bearing housing is set at a predetermined position of said burring portions and held by said burring portions, wherein said cylindrical portion includes an inner circumferential portion and a step portion at the inner circumferential portion, wherein the cup-like bearing housing is processed from a one piece metal material by a drawing process, wherein at least a part of the cylindrical portion below the step portion serves as a bearing fixing portion, wherein a portion of the radial bearing above the step portion rotatably supports the rotary shaft.

81. The motor in accordance with claim 80, wherein the inner circumferential portion above the step portion has a greater diameter than that of the bearing fixing portion.

82. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said bearing housing is fixedly coupled to said stator plate in a state that said bearing housing is set at a predetermined position of said burring portions and held by said burring portions, wherein the radial bearing is a single piece member, wherein the cylindrical portion includes a first inner circumferential portion and a second inner circumferential portion, the first inner circumferential portion has an inner diameter larger than the second inner circumferential portion, wherein the cup-like bearing housing is processed from a one piece metal material by a drawing process, wherein a part of the second inner circumferential portion is press fit to the radial bearing at a bearing fixing portion, wherein a portion of the radial bearing above the bearing fixing portion rotatably supports the rotary shaft inside the first inner circumferential portion.

83. The motor in accordance with claim 82, wherein a portion of the radial bearing below the bearing fixing portion rotatably supports the rotary shaft inside the second inner circumferential portion.

84. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said bearing housing is fixedly coupled to said stator plate in a state that said bearing housing is set at a predetermined position of said burring portions and held by said burring portions, wherein said cylindrical portion further comprises: an inner circumferential portion and a step portion at the inner circumferential portion between a bearing fixing portion and a core holding portion, an inner circumferential surface of the core holding portion having a greater diameter than an inner circumferential surface of the bearing fixing portion, wherein the cup-like bearing housing is processed from a one piece metal material by a drawing process.

85. A motor comprising:

a cup-like bearing housing integrally including a cylindrical portion, a bottom portion and a hollow portion defined by said cylindrical portion and said bottom;

a radial bearing held in said hollow portion while being in contact with an inner surface of said cylindrical portion;

a thrust receiving plate disposed at said bottom portion of said cup-like bearing housing;

a rotary shaft rotatably supported by said radial bearing in a state that an extreme end thereof is in contact with said thrust receiving plate; wherein said bearing housing is fixedly coupled to said stator plate in a state that said bearing housing is set at a predetermined position of said burring portions and held by said burring portions, wherein a core holding portion has an inner diameter greater than that of a bearing fixing portion.

* * * * *